United States Patent
Higashiyama

(10) Patent No.: US 7,076,963 B2
(45) Date of Patent: Jul. 18, 2006

(54) TWO-STAGE COMPRESSOR FOR AN AUTOMOTIVE AIR CONDITIONER, WHICH CAN BE DRIVEN BY A VEHICLE RUNNING ENGINE AND AN ELECTRIC MOTOR DIFFERENT THEREFROM

(75) Inventor: Akiyoshi Higashiyama, Isesaki (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 10/375,087

(22) Filed: Feb. 28, 2003

(65) Prior Publication Data
US 2003/0167784 A1    Sep. 11, 2003

(30) Foreign Application Priority Data
Mar. 6, 2002    (JP)    .............. 2002-059873

(51) Int. Cl.
F25B 27/00    (2006.01)
(52) U.S. Cl. .................................. 62/228.3
(58) Field of Classification Search ............. 62/228.3, 62/196.2, 196.3, 228.5, 236, 510, 512, 28.5; 417/410.5, 374, 410; 418/5
See application file for complete search history.

(56) References Cited

U.S. PATENT DOCUMENTS

| | | | | |
|---|---|---|---|---|
| 2,677,251 A | * | 5/1954 | Clark | 62/196.2 |
| 4,609,329 A | * | 9/1986 | Pillis et al. | 417/282 |
| 4,812,622 A | * | 3/1989 | Takeda et al. | 219/400 |
| 5,236,311 A | * | 8/1993 | Lindstrom | 417/254 |
| 5,428,966 A | * | 7/1995 | Alsenz | 62/116 |
| 5,839,886 A | * | 11/1998 | Shaw | 417/250 |
| 5,867,996 A | | 2/1999 | Takano et al. | |
| 6,192,155 B1 | | 2/2001 | Fan | |
| 6,217,297 B1 | | 4/2001 | Tsumagari et al. | |
| 6,230,507 B1 | * | 5/2001 | Ban et al. | 62/228.4 |
| 6,234,769 B1 | * | 5/2001 | Sakai et al. | 417/374 |
| 6,247,899 B1 | | 6/2001 | Ban et al. | |
| 6,287,081 B1 | | 9/2001 | Tamegai et al. | |
| 6,334,755 B1 | | 1/2002 | Coudray et al. | |
| 6,351,957 B1 | * | 3/2002 | Hara | 62/236 |
| 6,375,436 B1 | * | 4/2002 | Irie et al. | 417/223 |
| 6,443,712 B1 | | 9/2002 | Sakai et al. | |
| 6,540,489 B1 | * | 4/2003 | Higashiyama | 417/410.1 |
| 6,543,243 B1 | * | 4/2003 | Mohrmann et al. | 62/230 |
| 2003/0053916 A1 | | 3/2003 | Terauchi | |
| 2003/0136138 A1 | | 7/2003 | Tsuboi et al. | |
| 2003/0152467 A1 | | 8/2003 | Higashiyama et al. | |

FOREIGN PATENT DOCUMENTS

| | | | |
|---|---|---|---|
| EP | 1284366 A1 | * | 2/2003 |
| JP | 402119689 A | * | 5/1990 |
| JP | 405071486 A | * | 3/1993 |
| JP | 687678 | | 12/1994 |
| JP | 200097177 | | 4/2000 |
| JP | 02000110734 A | * | 4/2000 |

* cited by examiner

Primary Examiner—Mohammad M. Ali
(74) Attorney, Agent, or Firm—Baker Botts, LLP

(57) ABSTRACT

A compressor is used in an automotive air conditioner to compress a refrigerant gas. The compressor includes a first compression mechanism driven by an automobile engine and a second compression mechanism driven by an electric motor. The first and the second compression mechanisms are connected in series to each other with respect to a flow of the refrigerant gas. Preferably, the first compression mechanism is disposed on a downstream side of the second compression mechanism with respect to the flow of the refrigerant gas.

13 Claims, 3 Drawing Sheets

TWO-STAGE COMPRESSOR FOR AN AUTOMOTIVE AIR CONDITIONER, WHICH CAN BE DRIVEN BY A VEHICLE RUNNING ENGINE AND AN ELECTRIC MOTOR DIFFERENT THEREFROM

BACKGROUND OF THE INVENTION

This application claims priority to Japanese Patent Application No. 2002-59873, disclosure of which is incorporated herein by reference.

The present invention relates to a compressor for compressing a refrigerant in two stages (hereinafter referred to as a "two-stage compressor") and to an automotive air conditioner using the two-stage compressor.

For example, Japanese Unexamined Patent Publication No. 2000-97177 (JP 2000-97177 A) discloses a compressor used in a refrigerating cycle. The compressor comprises a two-stage compression mechanism for compressing a refrigerant in two stages and an electric motor for driving the compression mechanism. By compressing the refrigerant in two stages, a compression ratio in each stage can be lowered as compared with single-stage compression. It is therefore possible to suppress refrigerant leakage in a compression process and to thereby improve the efficiency of the compressor.

However, the two-stage compression mechanism is driven by a single drive source comprising the electric motor, the electric motor must be large in scale. This results in an increase in production cost of the compressor.

In case where the compressor is used in an automotive air conditioner, the two-stage compression mechanism may be driven by an automobile engine. In this event, however, the operation of the two-stage compression mechanism depends upon the rotation speed of the engine. This may result in execution of excessive and useless compression work exceeding a desired cooling power, increasing the load upon the engine and lowering fuel economy.

SUMMARY OF THE INVENTION

It is therefore an object of the present invention to provide a two-stage compressor for an automotive air conditioner, which is low in production cost.

It is another object of the present invention to provide a two-stage compressor of the type described, which is small in load upon an engine.

It is still another object of the present invention to provide a two-stage compressor of the type described, which is high in efficiency without carrying out excessive and useless compression work.

It is yet another object of the present invention to provide an automotive air conditioner using the above-mentioned two-stage compressor.

Other objects of the present invention will become clear as the description proceeds.

According to an aspect of this invention, there is provided a compressor for use in an automotive air conditioner to compress a refrigerant gas. The compressor comprises a first compression mechanism driven by an automobile engine and a second compression mechanism driven by an electric motor. The first and the second compression mechanisms are connected in series to each other with respect to a flow of the refrigerant gas.

According to an aspect of this invention, there is provided an automotive air conditioner comprising the above-mentioned compressor and a controller connected to the electric motor for controlling operation of the compressor in response to a required cooling power of the automotive air conditioner.

DESCRIPTION OF THE PREFERRED EMBODIMENTS

Figure 1:
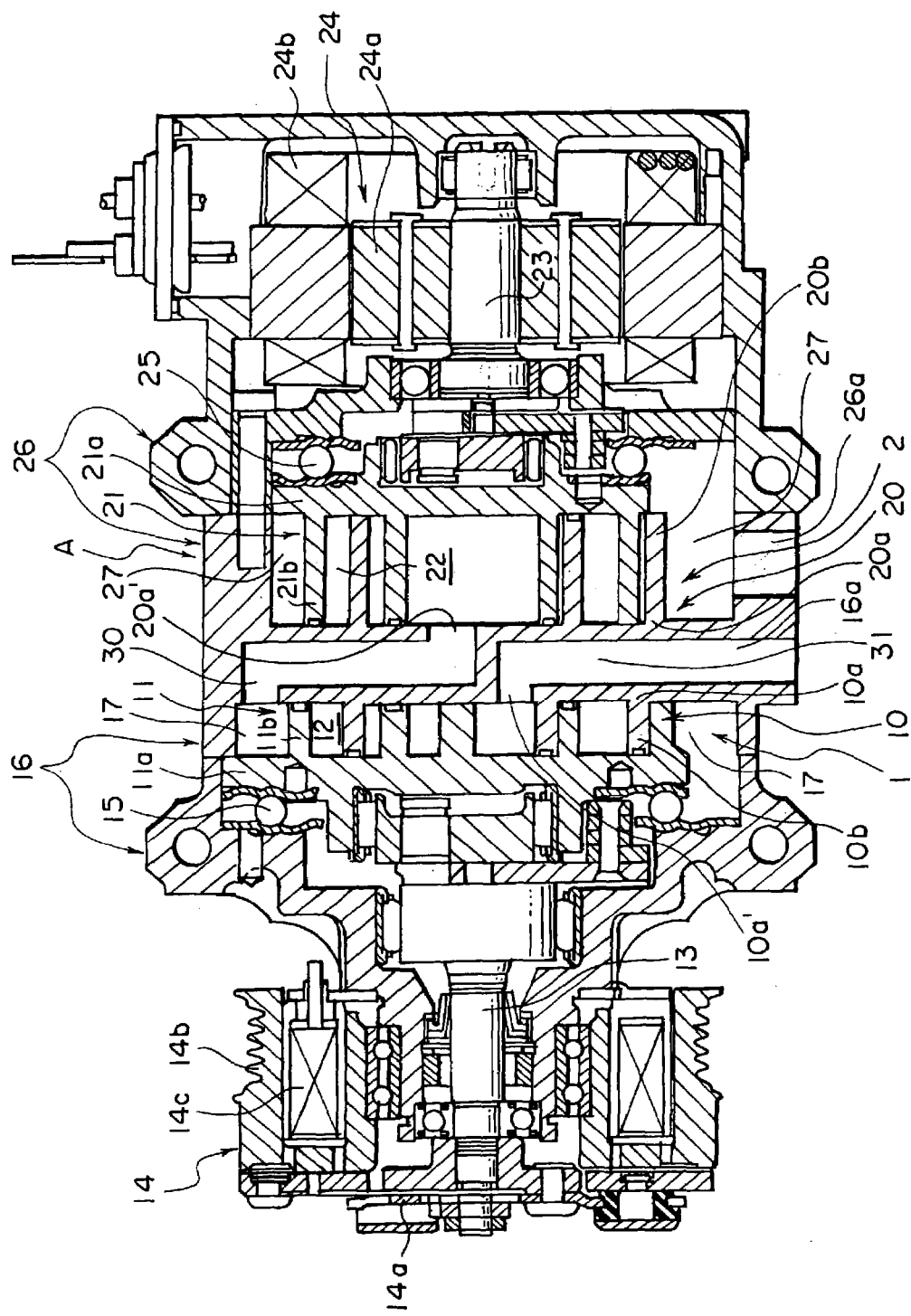
FIG. 1 is a longitudinal sectional view of a two-stage compressor according to an embodiment of this invention.

Referring to FIG. 1, description will be made of a two-stage compressor according to an embodiment of this invention.

The two-stage compressor A is used in an automotive air conditioner illustrated in the figure and comprises a first compression mechanism 1 and a second compression mechanism 2. Each of the first and the second compression mechanisms 1 and 2 has a function of compressing a refrigerant gas, as will later be described.

The first compression mechanism 1 comprises a fixed scroll 10 having an end plate 10a and an involute member or a spiral wrap 10b extending from the end plate 10a, and a movable scroll 11 having an end plate 11a and an involute member or a spiral wrap 11b extending from the endplate 11a. The movable scroll 11 is engaged with the fixed scroll 10 to form a plurality of compression chambers 12. The end plate 10a of the fixed scroll 10 is provided with a discharge hole 10a'.

The first compression mechanism 1 further comprises a drive shaft 13 engaged with the movable scroll 11 to make the movable scroll 11 perform orbital movement, an electromagnetic clutch 14 having a clutch armature 14a fixed to the drive shaft 13, a pulley 14b connected to an automobile engine through a belt, and an electromagnet 14c for coupling and releasing the clutch armature 14a and the pulley 14b, and a ball coupling 15 for inhibiting rotation of the movable scroll 11 around its own axis. The automobile engine may be at least one of a vehicle running internal combustion engine and a vehicle running electric motor.

The fixed scroll 10, the movable scroll 11, the drive shaft 13, and the ball coupling 15 are accommodated in a housing 16. The housing 16 is provided with a discharge port 16a. The discharge port 16a is in communication with a high-pressure side of an automotive air conditioning circuit (not shown). The fixed scroll 10 and the movable scroll 11 are surrounded by a suction chamber 17.

The second compression mechanism 2 comprises a fixed scroll 20 having an end plate 20a and an involute member or a spiral wrap 20b extending from the end plate 20a, and a movable scroll 21 having an end plate 21a and an involute member or a spiral wrap 21b extending from the end plate 20a. The movable scroll 21 is engaged with the fixed scroll 20 to form a plurality of pairs of compression chambers 22. The end plate 20a of the fixed scroll 20 is provided with a discharge hole 20a'.

The second compression mechanism 2 further comprises a drive shaft 23 engaged with the movable scroll 21 to make the movable scroll 21 perform orbital movement, an electric motor 24 having a rotator 24a fixed to the drive shaft 23 and a stator 24b, and a ball coupling 25 for inhibiting rotation of the movable scroll 21 about its own axis.

The fixed scroll 20, the movable scroll 21, the drive shaft 23, the electric motor 24, and the ball coupling 25 are accommodated in a housing 26. The housing 26 is provided with a suction port 26a. The suction port 26a is in communication with a low-pressure side of the automotive air conditioning circuit. The fixed scroll 20 and the movable scroll 21 are surrounded by a suction chamber 27.

The first and the second compression mechanisms 1 and 2 are integrally coupled to each other. The fixed scroll 10 of the first compression mechanism 1 and the fixed scroll 20 of the second compression mechanism 2 are disposed back to back. The fixed scroll 10, the fixed scroll 20, a part of the housing 16, and a part of the housing 26 are integrally formed. In the end plates 10a and 20a integral with each other, a communicating path 30 and a discharge path 31 are formed. The communicating path 30 provides communication between the discharge hole 20a' of the second compression mechanism 2 and the suction chamber 17 of the first compression mechanism 1 while the discharge path 31 provides communication between the discharge hole 10a' of the first compression mechanism 1 and the discharge port 16a.

When the two-stage compressor A is operated, the electromagnetic clutch 14 and the electric motor 24 are turned on. The rotation of the electric motor 24 is transmitted to the drive shaft 23 of the second compression mechanism 2. The drive shaft 23 drives the orbital movement of the movable scroll 21. A refrigerant gas returned from the low-pressure side of the automotive air conditioning circuit to the two-stage compressor A passes through the suction port 26a and flows into the suction chamber 27 of the second compression mechanism 2 to be introduced from the suction chamber 27 into the compression chambers 22 of the second compression mechanism 2. The compression chambers 22 are reduced in volume and move towards the center of the fixed scroll 20 so that the refrigerant gas in the compression chambers 22 is compressed. The refrigerant gas after compressed is discharged through the discharge hole 20a' formed in the end plate 20a of the fixed scroll 20. The refrigerant gas discharged through the discharge hole 20a' of the second compression mechanism 2 passes through the communicating path 30 and flows into the suction chamber 17 of the first compression mechanism 1. Thus, the first compression mechanism 1 is connected in series to the second compression mechanism 2 and disposed on a downstream side thereof with respect to a flow of the refrigerant gas.

The rotation of the automobile engine is transmitted through the clutch armature 14a to the drive shaft 13 of the first compression mechanism 1. The drive shaft 13 drives the orbital movement of the movable scroll 11. The refrigerant gas in the suction chamber 17 is introduced into the compression chambers 12 of the first compression mechanism 1. The compression chambers 12 are reduced in volume and move towards the center of the fixed scroll 10 so that the refrigerant gas in the compression chambers 12 is compressed. The refrigerant gas after compressed passes through the discharge hole 10a' formed in the end plate 10a of the fixed scroll 10 to be discharged to the discharge path 31 and then passes through the discharge port 16a to flow out towards the high-pressure side of the automotive air conditioning circuit.

The refrigerant gas compressed by the first compression mechanism 2 is further compressed by the first compression mechanism 1. Thus, the refrigerant gas is compressed in two stages. By the two-stage compression, the compression ratio in each compression mechanism is lowered as compared with single-stage compression, so that compression leakage in a compression process is suppressed and the efficiency of the compressor is improved. The first compression mechanism 1 is driven by the automobile engine as a drive source while the second compression mechanism 2 is driven by the electric motor 24 as another drive source. Therefore, a load imposed upon each drive source is relatively small. By the use of the two-stage compressor A, the load upon the automobile engine is decreased and a large-scale electric motor is not required to drive the second compression mechanism 2.

Considering that the refrigerant gas compressed by the second compression mechanism 2 is introduced into the first compression mechanism 1, an intake volume of the first compression mechanism 1 is designed to be smaller than that of the second compression mechanism, preferably, to be ½ or more. As a consequence, the two-stage compressor A can be reduced in size.

Each of the first and the second compression mechanisms 1 and 2 is a scroll-type compression mechanism. The fixed scroll 10 and the fixed scroll 20 are disposed back to back with the communicating path 30 and the discharge path 31 formed therebetween. With this structure, the two-stage compressor A can further be reduced in size.

The rotation speed of the electric motor 24 may be variably controlled. If the rotation speed of the electric motor 24 is variably controlled, the suction flow rate of the two-stage compressor A can be increased or decreased in dependence upon an increase or a decrease of the load upon the automotive air conditioner. Thus, excellent air conditioning can be realized.

The compression ratio of the scroll-type second compression mechanism 2 may be equal to two or less. In case where the compression ratio of the scroll-type second compression mechanism 2 is equal to two or less, the number of turns of each of the spiral wraps 20b and 21b is one or less. With this structure, the spiral wrap 20b of the fixed scroll 20 and the spiral wrap 21b of the movable scroll 21 may be separated from each other in the refrigerant compression process. In this event, the compression chambers 22 formed between the spiral wrap 20b of the fixed scroll 20 and the spiral wrap 21b of the movable scroll 21 communicate with each other. As a consequence, the suction chamber 27 of the second compression mechanism 2 and the discharge hole 20a' communicate with each other. The above-mentioned state means that the compressing operation of the second compression mechanism 2 is substantially stopped. By utilizing the above, the second compression mechanism 2 is stopped and the first compression mechanism 1 alone is operated to compress the refrigerant gas when the load upon the automotive air compressor is small. As a result, energy consumption can be saved.

Figure 2:
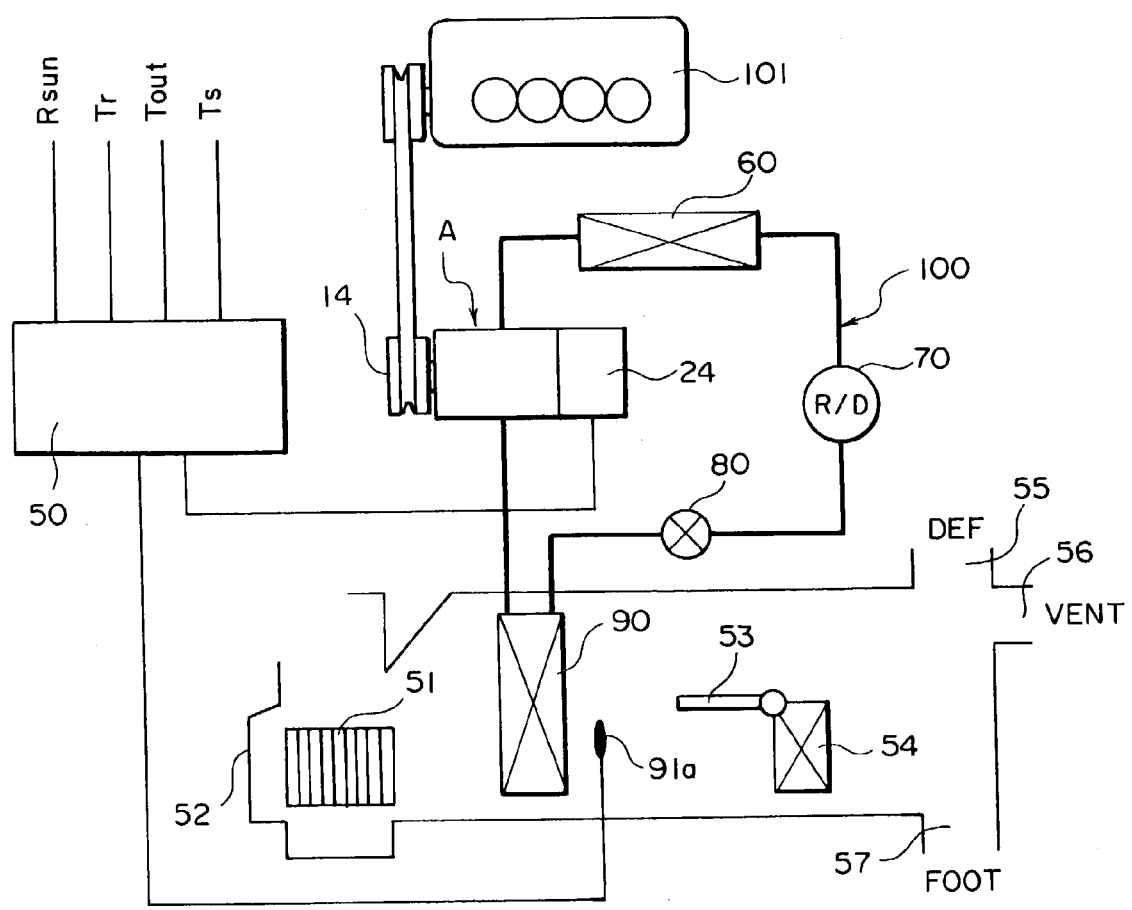
FIG. 2 is a system diagram of an automotive air conditioner including the two-stage compressor illustrated in FIG. 1.

Referring to FIG. 2, the description will be directed to the automotive air conditioner using the above-mentioned two-stage compressor A. The automotive air conditioner is provided with a controller 50 connected to the electric motor 24. The controller 50 detects a required cooling power of the automotive air conditioner and controls operation of the compressor in response to the required cooling power. When the required cooling power is small, the controller 50 stops the electric motor 24 or reduces the rotation speed of the electric motor 24 so that the cooling power of the automotive air conditioner is decreased.

More particularly, the automotive air conditioner will be described in the following. The automotive air conditioner has a refrigerating cycle 100. The refrigerating cycle 100 is provided with the compressor A having the electromagnetic clutch 14 for transmitting drive force of an engine 101 as a prime mover of an automobile. A high-temperature high-pressure refrigerant compressed by the compressor A is supplied to a condenser 60 as an external heat exchanger and cooled by heat exchange with outside air to be condensed and put into a liquid phase. The refrigerant is separated by a liquid receiver 70 into a gaseous-phase refrigerant and a liquid-phase refrigerant. The liquid-phase refrigerant is reduced in pressure by an expansion valve 80 into a low-pressure liquid-phase refrigerant. The low-pressure liquid-phase refrigerant flows into an evaporator 90 as an internal heat exchanger and is subjected to heat exchange with air blown by a fan or a blower 51 to be evaporated into a gaseous-phase refrigerant. The gaseous-phase refrigerant is sucked again into the compressor A to be compressed.

An air duct 52 is for passage of air directing to an automobile compartment or room and is provided with the blower 51, the evaporator 90, an air-mix damper 53, and a heater core 54. After passing through the evaporator 90, the air passes through the heater core 54 at a ratio determined by an aperture of the air-mix damper 53 to be heated. On a downstream end of the air duct 52, discharge ports 55, 56, and 57 such as DEF, VENT, and FOOT are formed. By dampers (not shown), a predetermined one or ones of the discharge ports are selected to deliver conditioned air into the automobile compartment or room.

The controller 50 detects the required cooling power of the automotive air conditioner. If the required cooling power is large, the controller 50 increases the rotation speed of the electric motor 24 to thereby increase the cooling power of the automotive air conditioner.

Thus, the controller 50 can readily cope with variation in desired cooling power of the automotive air conditioner by stopping the electric motor 24, reducing the rotation speed of the electric motor 24, or increasing the rotation speed of the electric motor 24.

The evaporator 90 of the automotive air conditioner is provided with an evaporator outlet air temperature sensor 91a for detecting an evaporator outlet air temperature T1. With reference to a set temperature Ts determined by a driver or a passenger in the automobile, an outside air temperature Tout, a room temperature Tr, and solar irradiation Rsun, a target evaporator outlet air temperature T2 is calculated. By comparing the evaporator outlet air temperature T1 and the target evaporator outlet air temperature T2, the required cooling power of the automotive air conditioner can be detected. If T1>T2, the required cooling power of the automotive air conditioner is great. If T1<T2, the required cooling power of the automotive air conditioner is small. Even if T1>T2, when the difference between T1 and T2 is small, the required cooling power of the automotive air conditioner is small. The required cooling power of the automotive air conditioner can be detected not only by the above-mentioned method but also by any other appropriate method.

Figure 3:
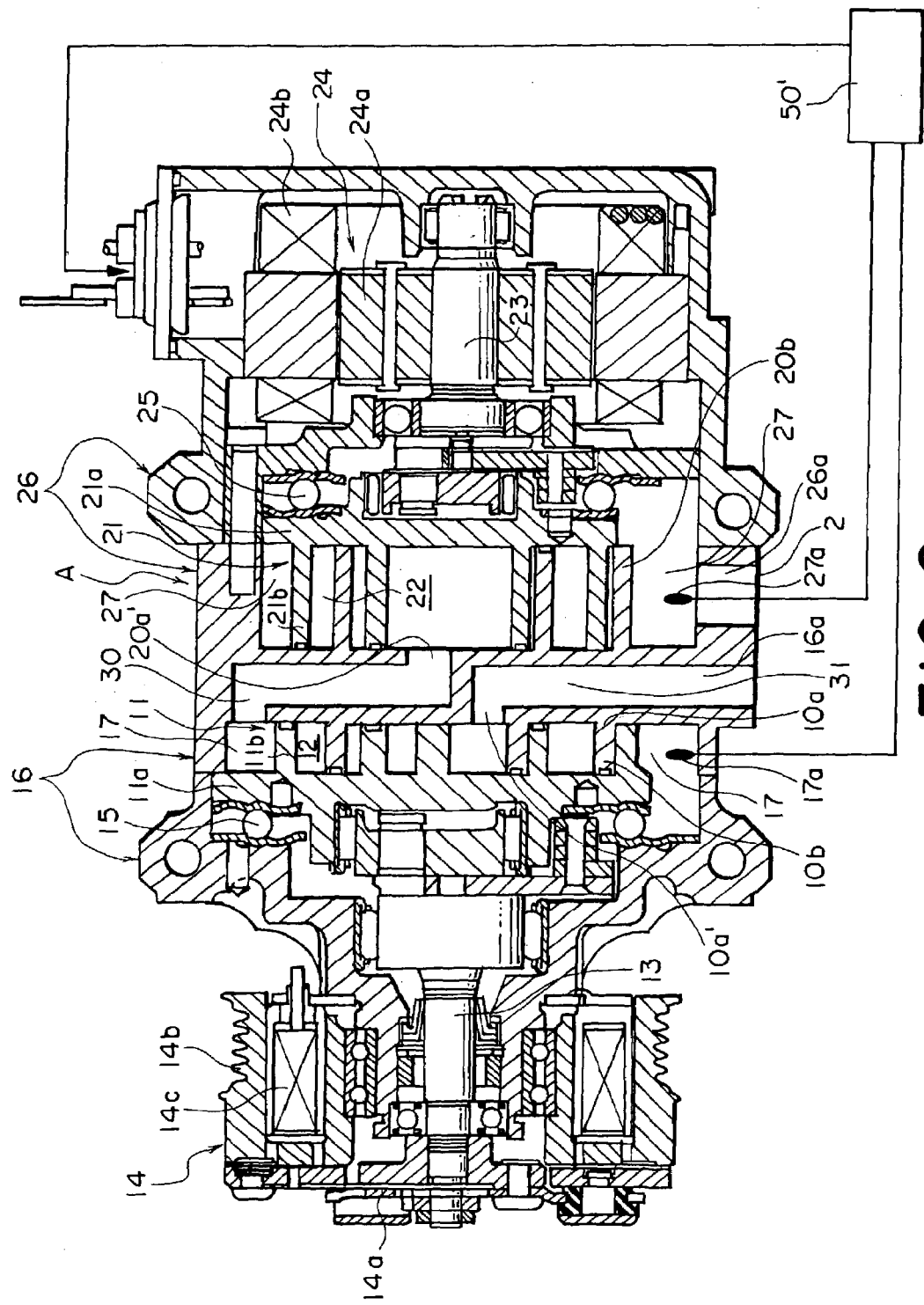
FIG. 3 is a modification of the two-stage compressor with a pressure-based control system.

Referring to FIG. 3, the automotive air conditioner is provided with a pair of pressure sensors 27a and 27b for detecting pre-compression pressure and post-compression pressure of the refrigerant gas compressed by the second compression mechanism 2 before and after compression, i.e., the pressure of the suction chamber 27 and the pressure of the suction chamber 17, respectively. A controller 50' controls the rotation speed of the electric motor 24 so that the ratio between the pre-compression pressure and the post-compression pressure falls within a predetermined range.

By making the ratio between the pre-compression pressure and the post-compression pressure of the refrigerant gas compressed by the second compression mechanism 2 be kept constant, it is possible to suppress excessive and useless compression work of the second compression mechanism 2.

While the present invention has thus far been described in connection with a few embodiments thereof, it will readily be possible for those skilled in the art to put this invention into practice in various other manners. For example, the first compression mechanism 1 and/or the second compression mechanism 2 may be another compression mechanism of a well known type, such as a swash-plate type or a vane type, other than the scroll type.

What is claimed is:

1. A compressor for use in an automotive air conditioner to compress a refrigerant gas, the compressor comprising:
   a first compression mechanism driven by an automobile engine; and
   a second compression mechanism driven by an electric motor, the first and the second compression mechanisms being connected in series to each other with respect to a flow of the refrigerant gas via a communication path enclosed within a housing enclosing said first compression mechanism and said second compression mechanism and extending between said first compression mechanism and said second compression mechanism.

2. The compressor according to claim 1, wherein the first compression mechanism is disposed on a downstream side of the second compression mechanism with respect to the flow of the refrigerant gas.

3. The compressor according to claim 1, wherein the first compression mechanism has a first compression chamber for compressing the refrigerant gas while the second compression mechanism has a second compression chamber for compressing the refrigerant gas, the first compression chamber being smaller in intake volume than the second compression chamber.

4. The compressor according to claim 1, wherein the electric motor is contained in the compressor and has a variable rotation speed.

5. The compressor according to claim 1, wherein the second compression mechanism is of a scroll type.

6. The compressor according to claim 5, wherein the second compression mechanism has a compression ratio not greater than two.

7. The compressor according to claim 5, wherein the first compression mechanism is of a scroll type.

8. An automotive air conditioner comprising:
   the compressor according to claim 1; and
   a controller connected to the electric motor for controlling operation of the compressor in response to a required cooling power of the automotive air conditioner.

9. The automotive air conditioner according to claim 8, wherein the controller stops operation of the electric motor in case where the required cooling power is relatively small.

10. The automotive air conditioner according to claim 8, wherein the controller decreases a rotation speed of the electric motor in case where the required cooling power is relatively small.

11. The automotive air conditioner according to claim 8, wherein the controller increases a rotation speed of the electric motor in case where the required cooling power is relatively large.

12. An automotive air conditioner comprising:
the compressor according to claim 1;
a pressure measurement device connected to the compressor for measuring pre-compression pressure and post-compression pressure of the refrigerant gas compressed by the second compression mechanism before and after compression; and
a controller connected to the electric motor for controlling a rotation speed of the electric motor so that a ratio between the pre-compression pressure and the post-compression pressure falls within a predetermined range.

13. The compressor according to claim 1, wherein said communication path extends between a discharge port of said second compression mechanism and a suction port of said first compression mechanism.

* * * * *